United States Patent
Yeom et al.

(10) Patent No.: US 9,583,998 B2
(45) Date of Patent: Feb. 28, 2017

(54) METHOD OF ASSEMBLING A ROTOR FOR AN ELECTRIC TURBO-CHARGER

(71) Applicant: Hyundai Motor Company, Seoul (KR)

(72) Inventors: Kitae Yeom, Seoul (KR); Jaesik Yang, Seoul (KR); Sung Won Kim, Hwaseong-si (KR); Tae Won Hwang, Seoul (KR); Jae Man Lim, Daejeon (KR); Hong-Young Lee, Daejeon (KR)

(73) Assignee: Hyundai Motor Company, Seoul (KR)

( * ) Notice: Subject to any disclaimer, the term of this patent is extended or adjusted under 35 U.S.C. 154(b) by 502 days.

(21) Appl. No.: 14/099,443

(22) Filed: Dec. 6, 2013

(65) Prior Publication Data

US 2014/0184006 A1  Jul. 3, 2014

(30) Foreign Application Priority Data

Dec. 31, 2012  (KR) .................. 10-2012-0158627

(51) Int. Cl.
| | |
|---|---|
| H02K 15/02 | (2006.01) |
| H02K 15/10 | (2006.01) |
| H02K 15/03 | (2006.01) |
| H02K 1/27 | (2006.01) |

(52) U.S. Cl.
CPC ........... *H02K 15/03* (2013.01); *H02K 1/2733* (2013.01); *Y10T 29/49012* (2015.01)

(58) Field of Classification Search
CPC .. H02K 1/276; H02K 15/03; Y10T 29/49012; F05D 2220/40; F05D 2230/60
USPC .... 29/598, 596, 607; 310/50, 51, 58, 61, 62, 310/64, 68 R, 89, 156.11
See application file for complete search history.

(56) References Cited

U.S. PATENT DOCUMENTS

| 5,831,358 A | * | 11/1998 | Bobay | ................ H02K 7/04 |
| | | | | 310/216.117 |
| 5,939,807 A | * | 8/1999 | Patyk | ................ H02K 5/161 |
| | | | | 310/64 |

FOREIGN PATENT DOCUMENTS

| CN | 2097466 U | 2/1992 |
| CN | 2099411 U | 3/1992 |
| EP | 2 511 532 A1 | 10/2012 |
| JP | 57-95172 A | 6/1982 |
| KR | 10-0193430 B1 | 6/1999 |
| KR | 10-2004-0041185 A | 5/2004 |

* cited by examiner

Primary Examiner — Thiem Phan
(74) Attorney, Agent, or Firm — Morgan, Lewis & Bockius LLP

(57) ABSTRACT

A rotor assembling method for a turbo-charger may include washing and preparing components of a rotor having a connector, a permanent magnet, end caps, a retention ring, and a center pipe, inserting the connector into the permanent magnet, thermally inserting one or more end caps into the connector by cooling the connector and heating the one or more end caps under a first high-temperature condition for a first predetermined time to form a permanent magnet assembly, thermally inserting the permanent magnet assembly into the retention ring by cooling the permanent magnet assembly and heating the retention ring under a second high-temperature condition for a second predetermined time to form a rotor assembly, thermally inserting the center pipe into the rotor assembly by heating the rotor assembly under a third high-temperature condition for a third predetermined time to form a rotor assembling body, and post processing the rotor assembling body.

10 Claims, 5 Drawing Sheets

METHOD OF ASSEMBLING A ROTOR FOR AN ELECTRIC TURBO-CHARGER

CROSS-REFERENCE TO RELATED APPLICATION

The present application claims priority of Korean Patent Application Number 10-2012-0158627 filed Dec. 31, 2012, the entire contents of which application are incorporated herein for all purposes by this reference.

BACKGROUND OF INVENTION

Field of Invention

The present invention relates to a rotor assembling method for an electric turbo-charger and a rotor assembled by the same, and more particularly, to a rotor assembling method for an electric turbo-charger in which a temperature has less influences on a permanent magnet at the time of thermally inserting a rotor component and post processing is easier such as in tip clearance adjustment, and a rotor assembled by the same.

Description of Related Art

In general, a turbo-charger is a device that rotates a turbine by using pressure of exhaust gas discharged from an engine and thereafter, increases an output of the engine by supplying high-pressure air to a combustion chamber by using rotational force thereof. The turbo-charger has a problem in which a turbo-lag phenomenon occurs at low speed.

As a result, in recent years, an electric turbo-charger is applied, in which a compressor is driven by a drive motor at low speed and the compressor is driven by using the rotational force of the turbine that is rotated by the exhaust gas at high speed by driving a shaft of the turbo-charger with an electric motor.

The electric turbo-charger has an electric motor provided in a housing thereof, and in the electric motor, a rotor is installed on a shaft that connects a turbine wheel and a compressor wheel and a stator is installed in the housing thereof.

In particular, the performance or durability of the rotor depends on an interassembly method of a permanent magnet provided therein and a casing component for fixing the permanent magnet. That is, a connector, an end cap, a retention ring, and the like which are the casing components covering the permanent magnet are made of INCONEL materials, and have very high rigidity and are not easily processed.

Further, an irregular tolerance occurs on a connection surface of the shaft with the casing component due to a processing tolerance which occurs during processing and post processing is performed in order to remove the irregular tolerance. However, since INCONEL as the material of the casing component has high rigidity and precision is required for the assembly process, post processing is trouble and it is difficult to increase completeness.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a rotor assembling method for an electric turbo-charger having advantages in which a temperature less influences a permanent magnet, a tip clearance is easily adjusted, post processing with a shaft is easy by adopting an additional center pipe with a material having high processability, and connection force between a rotor and the shaft is increased, at the time of thermally inserting rotor components constituting the rotor of an electric motor, and a rotor assembled by the same.

Various aspects of the present invention provide a rotor assembling method for an electric turbo-charger, including a first step for washing and preparing components of a rotor including a connector, a permanent magnet, end caps, a retention ring, and a center pipe; a second step for inserting a connector into the permanent magnet; a third step for thermally inserting one or more end caps into the connector by cooling the connector and heating the one or more end caps under a first high-temperature condition for a first predetermined time to form a permanent magnet assembly; a fourth step for thermally inserting the permanent magnet assembly into the retention ring by cooling the permanent magnet assembly and heating the retention ring under a second high-temperature condition for a second predetermined time to form a rotor assembly; a fifth step for thermally inserting the center pipe into the rotor assembly by heating the rotor assembly under a third high-temperature condition for a third predetermined time to form a rotor assembling body; and a sixth step for post processing the rotor assembling body.

In the first step for washing and preparing the components, alcohol may be used as a washing liquid. In various cases, in the third step, one end cap may be integrally formed at one end of the connector and one end cap may be thermally inserted into the other side of the connector. In various other cases, in the third step, end caps are thermally inserted into both ends of the connector in the third step.

Liquid nitrogen may be used as a cooling liquid to cool the connector in the third step or the permanent magnet assembly in the fourth step or both. The one or more end caps in the third step or the retention ring in the fourth step or both may be heated in an oven at a temperature in the range of 650° C.±10° C. for 25 to 35 minutes. The rotor assembly in the fifth step is heated in the oven at a temperature in the range of 220° C.±5° C. for 12 hours or more. The sixth step for post processing the rotor assembling body may include surface treatment performed on connection surfaces of, between or among the retention ring, the end caps and the center pipe.

The connector, the end caps, and the retention ring may be made of an INCONEL material. The center pipe may be made of stainless, steel, or an aluminum-based material.

In a rotor for an electric turbo-charger assembled by the rotor assembling method, one end cap may be integrally formed at one end of the connector inserted into the permanent magnet having a cylindrical shape to support one end of the permanent magnet, the other end cap may be thermally inserted into the other end of the connector to support the other end of the permanent magnet, the retention ring may be thermally disposed at outer peripheries of the permanent magnet and both end caps, and the center pipe may be thermally inserted into inner peripheries of the other end cap and the connector.

The other end cap may be thermally inserted into a step surface formed at the other end of the connector. The connector, the end caps, and the retention ring may be made of an INCONEL material, and the center pipe may be made of stainless, steel, or an aluminum-based material.

In a rotor for an electric turbo-charger assembled by the rotor assembling method, one end cap may be integrally formed at one end of a connector inserted into the permanent magnet having a cylindrical shape to support one end of the permanent magnet, the other end cap may be thermally inserted into an outer peripheral surface of the connector to support the other end of the permanent magnet, the retention ring may be thermally disposed at outer peripheries of the permanent magnet and both end caps, and the center pipe may be thermally inserted into inner peripheries of the other end cap and the connector.

The connector, the end caps, and the retention ring may be made of an INCONEL material, and the center pipe may be made of stainless, steel, or an aluminum-based material.

In a rotor assembled by the rotor assembling method for an electric turbo-charger, end caps may be thermally inserted into both ends of a connector inserted into the permanent magnet having a cylindrical shape to support both ends of the permanent magnet, respectively, the retention ring may be thermally disposed at outer peripheries of the permanent magnet and both end caps, and the center pipe may be thermally inserted into inner peripheries of both end caps and the connector.

Each end cap may be thermally inserted into a step surface formed at a corresponding end of the connector. The connector, the end caps, and the retention ring may be made of an INCONEL material, and the center pipe may be made of stainless, steel, or an aluminum-based material.

According to the present invention, a connector, an end cap, and a retention ring which are casing components covering a permanent magnet can be precisely assembled through a thermal insertion process and in particular, a temperature has less influences on a permanent magnet and a tip clearance is easily adjusted.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
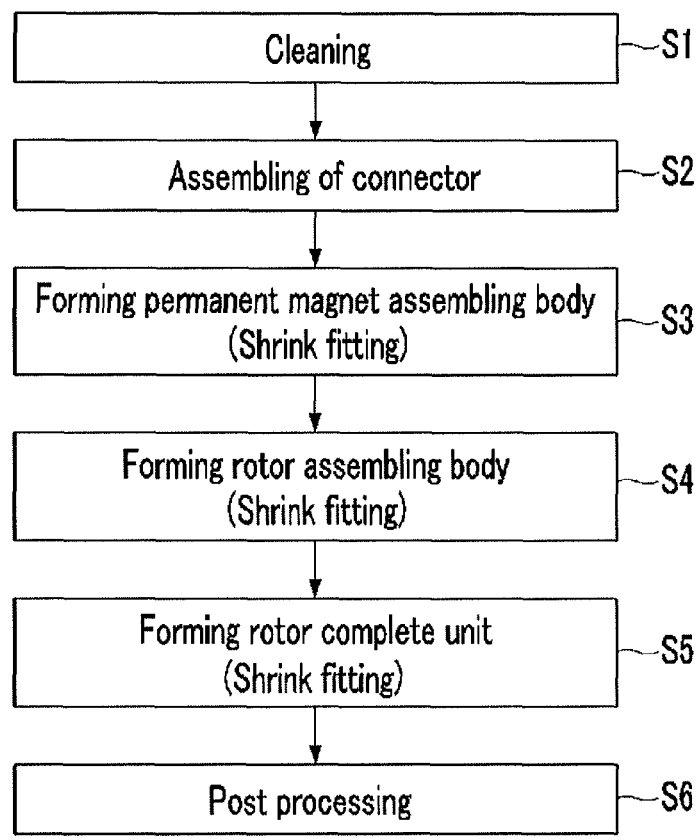
FIG. 1 is a process block diagram illustrating an exemplary rotor assembling method for an electric turbo-charger according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings. However, since the size and thickness of each component illustrated in the drawings are arbitrarily illustrated for easy description, the present invention is not particularly limited to those illustrated in the drawings and the thickness is extended in order to clearly express various parts and areas. Further, parts which are not related with the description are not illustrated in order to clearly describe the exemplary embodiments of the present invention and like reference numerals refer to like or similar elements throughout the specification.

Figure 2:
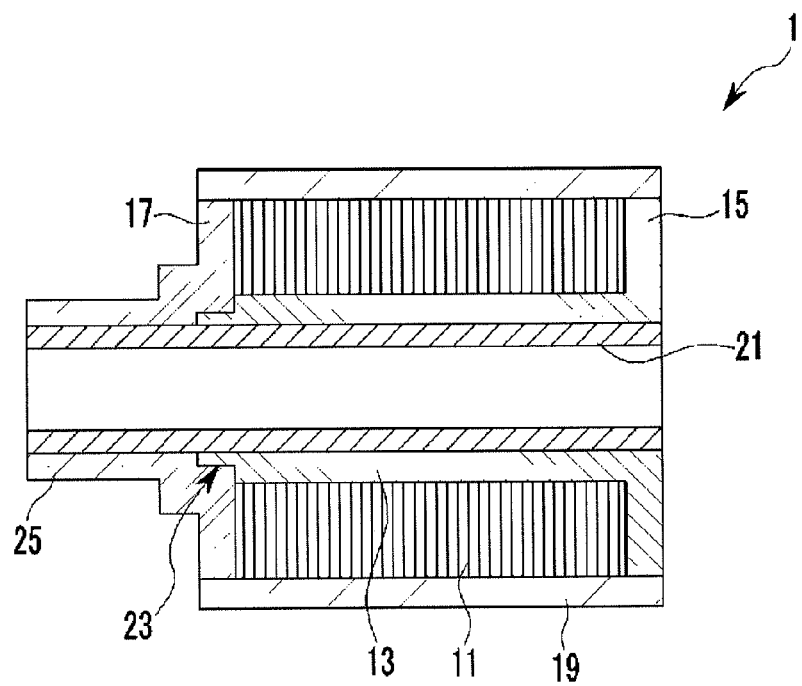
FIG. 2 is an assembly cross-sectional view of a first exemplary rotor according to the present invention.

FIG. 1 is a process block diagram illustrating a rotor assembling method for an electric turbo-charger according to various embodiments of the present invention and FIG. 2 is an assembly cross-sectional view of an exemplary rotor assembled by the rotor assembling method of the present invention.

Referring to FIGS. 1 and 2, the rotor assembling method for an electric turbo-charger includes a first step S1 of washing components, a second step (S2) of inserting a connector 13 into a permanent magnet 11, a third step (S3) of configuring a permanent magnet assembly, a fourth step (S4) of configuring a rotor assembly, a fifth step (S5) of configuring a rotor assembling body, and a sixth step (S6) of performing post processing.

In the first step (S1), the permanent magnet 11, the connector 13, end caps 15 and 17, a retention ring 19, and a center pipe 21 constituting a rotor 1 are washed. In this case, the components may be washed by using a washing liquid such as alcohol, or the like.

Herein, the connector 13, the end caps 15 and 17, and the retention ring 19 are made of austenitic nickel-chromium-based superalloy materials, INCONEL materials, and other suitable materials, and the center pipe 21 may be made of stainless, steel, aluminum-based materials, or other materials.

In various embodiments of the present invention, a center pipe made of a material having high processability is applied to a contact surface between the rotor and the shaft to facilitate an assembly work and increase assembly precision without directly processing a casing component made of a high-rigidity INCONEL material.

Further, a material which is relatively easier to process is applied to the center pipe to further increase the connection force between the shaft and the rotor, and increase processing precision even in post processing, and as a result, durability of all components is improved by securing stability in high-speed rotation.

In the second step (S2), the connector 13 is inserted into a hollow portion of the permanent magnet 11. In the third step (S3), the end caps 15 and 17 are thermally inserted into the connector 13 by cooling the connector 13 and heating the end caps 15 and 17 under a high-temperature condition for a predetermined time to constitute or form the permanent magnet assembly.

In various embodiments, one end cap 15 is integrally formed at one end of the connector 13, and as a result, the other end cap 17 may be thermally inserted and connected into the other side of the connector 15 while the connector 13 is inserted into the permanent magnet 11. One will appreciate that these integral components may be monolithically formed.

Figure 5:
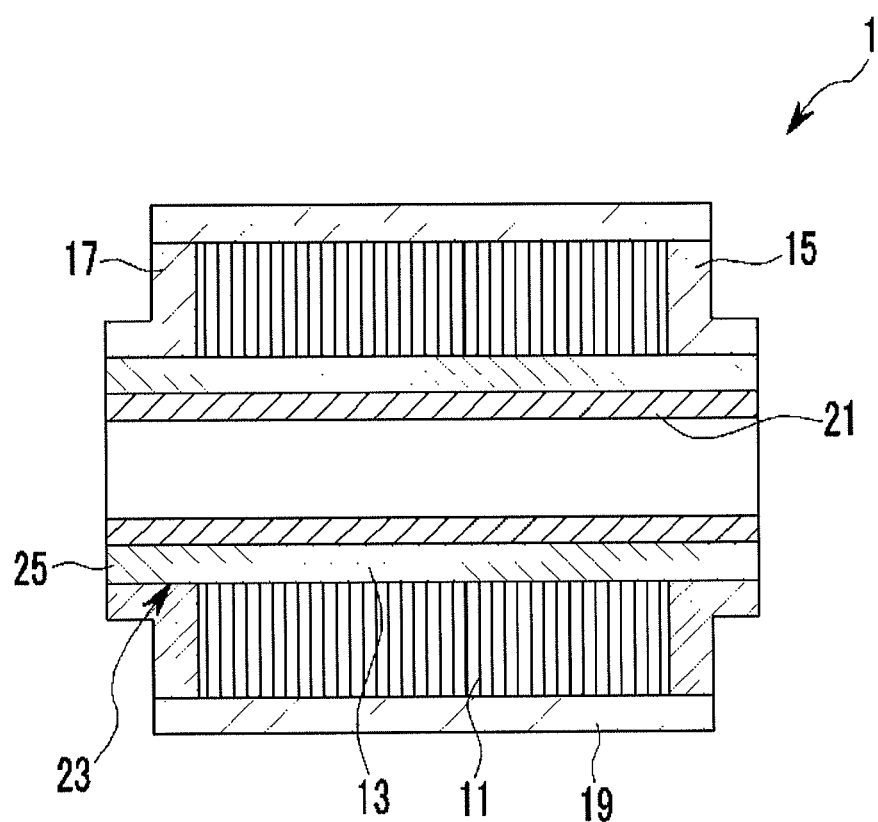
FIG. 5 is an assembly cross-sectional view of a fourth exemplary rotor according to the present invention.

Further, in various other embodiments, both end caps 15 and 17 are configured apart from the connector 13, and as a result, the end caps 15 and 17 may be thermally inserted and connected into both ends of the connector 13, respectively while the connector 13 is inserted into the permanent magnet 11, as described in FIG. 5.

The cooling in the third step (S3) may be achieved by using liquid nitrogen as a cooling liquid, and under the high-temperature condition, a condition that the end caps 15 and 17 may be heated in an oven within a temperature range of 650° C.±10° C. for approximately 30 minutes, e.g., for 25 to 35 minutes.

In the fourth step (S4), the retention ring 19 is thermally disposed at the permanent magnet assembly by cooling the permanent magnet assembly and heating the retention ring 19 under the high-temperature condition for a predetermined time to constitute or form the rotor assembly. The cooling in the fourth step (S4) may be achieved by the liquid nitrogen as the cooling liquid, and under the high-temperature condition, the retention ring 19 may be heated in an oven within a temperature range of 650° C.±10° C. for 30 minutes.

In the fifth step (S5), the rotor assembly is heated under the high-temperature condition for a predetermined time to be thermally inserted into the center pipe 21 to constitute or form the rotor assembling body. In this case, under the high-temperature condition, the rotor assembly may be heated in the oven in the range of 220° C.±5° C. for 12 hours or more.

In the sixth step (S6) as a step of post processing the rotor assembly, the post processing is achieved by performing surface treatment through grinding work of connection surfaces of the retention ring 20 and the end caps 15 and 17, and the center pipe 21.

Hereinafter, by way of illustration, four exemplary embodiments assembled by the rotor assembling method of the present invention are presented. The present invention, however, is not limited by these exemplary embodiments. On the contrary, the invention is intended to cover not only the exemplary embodiments, but also various alternatives, modifications, equivalents and other embodiments.

First, referring to FIG. 2, a rotor 1 according to the first exemplary embodiment of the present invention includes a permanent magnet 11, a connector 13, end caps 15 and 17, a retention ring 19, and a center pipe 21. In the rotor 1, the connector 13 is inserted into the permanent magnet 11 having a cylindrical shape and one end cap 15 is integrally formed at one end of the connector 13 to support one end of the permanent magnet 11. One will appreciate that these integral components may be monolithically formed.

Further, the other end cap 17 is thermally inserted into the other end of the connector 13 to support the other end of the permanent magnet 11. Herein, the other end cap 17 is thermally inserted into a step surface 23 formed the other end of the connector 13 to be more strongly connected.

Further, the retention ring 19 is thermally disposed at outer peripheries of both end caps 15 and 17 supporting the permanent magnet 11 to cover the permanent magnet 11.

Figure 3:
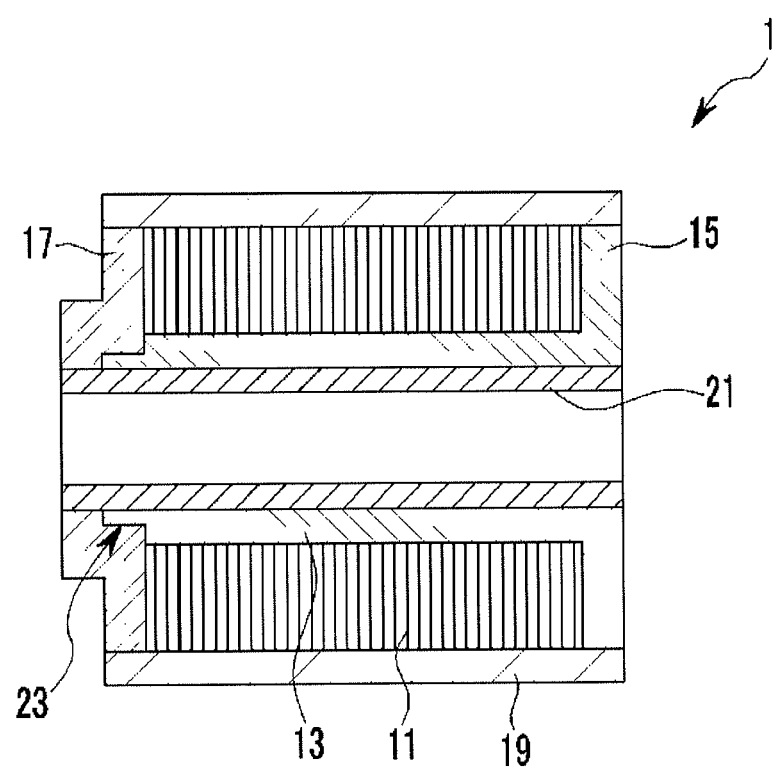
FIG. 3 is an assembly cross-sectional view of a second exemplary rotor according to the present invention.

FIG. 3 is an assembly cross-sectional view of a rotor according to a second exemplary embodiment by the rotor assembling method of the present invention. Referring to FIG. 3, the rotor 1 is formed by a configuration similar to the rotor 1 according to the first exemplary embodiment, and both rotors 1 are different from each other in that in the rotor 1 according to the first exemplary embodiment, an extension portion 25 extended from the other end cap 17 is integrally formed while, in the rotor 1 according to the second exemplary embodiment, the extension portion is not formed at the other end cap 17. One will appreciate that these integral components may be monolithically formed.

Figure 4:
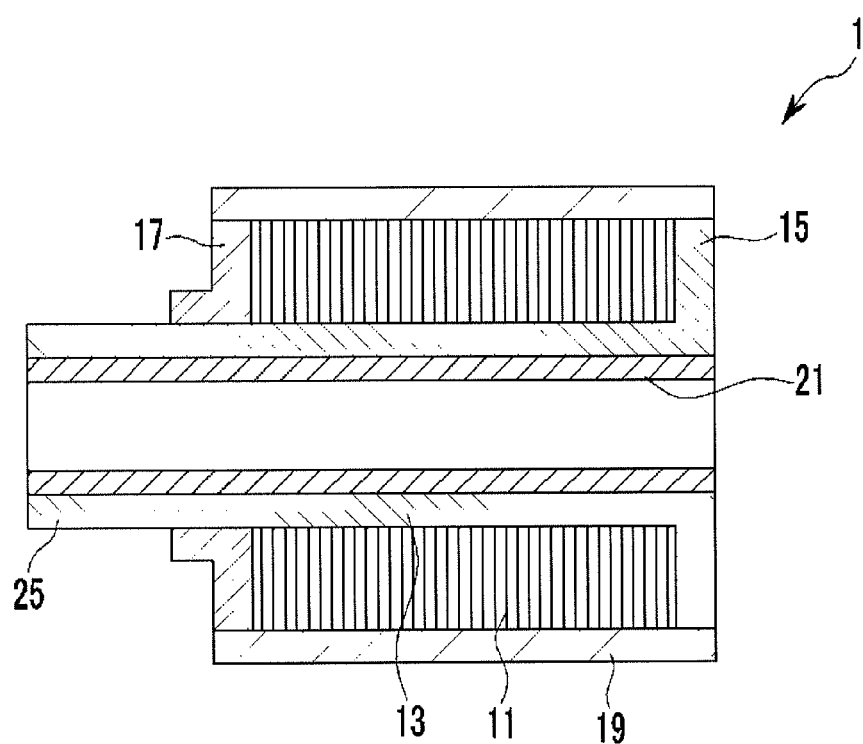
FIG. 4 is an assembly cross-sectional view of a third exemplary rotor according to the present invention.

FIG. 4 is an assembly cross-sectional view of a rotor according to a third exemplary embodiment by the rotor assembling method of the present invention. Referring to FIG. 4, the rotor 1 is formed by a configuration similar to the rotor 1 according to the first exemplary embodiment, and both rotors 1 are different from each other in that in the rotor 1 according to the first exemplary embodiment, the extension portion 25 is integrally formed at the other end cap 17, while, in the rotor 1 according to the third exemplary embodiment, the extension portion is not formed at the other end cap 17. One will appreciate that these integral components may be monolithically formed.

In the rotor 1 according to the third exemplary embodiment, the extension portion 25 extended from the connector 13 is formed integrally with the connector 13. One will appreciate that these integral components may be monolithically formed. Further, both rotors 1 in the first and third embodiments are different from each other in that in the rotor 1 according to the first exemplary embodiment, the other end cap 17 is thermally inserted into the step surface 23 formed at the other end of the connector 13, while in the rotor 1 according to the third exemplary embodiment, the other end cap 17 is thermally inserted into the extension portion 25 of the connector 13.

FIG. 5 is an assembly cross-sectional view of a rotor according to a fourth exemplary embodiment by the rotor assembling method of the present invention. Referring to FIG. 5, a rotor 4 according to the fourth exemplary embodiment of the present invention includes a permanent magnet 11, a connector 13, two end caps 15 and 17, a retention ring 19, and a center pipe 21.

The rotor 1 according to the fourth exemplary embodiment of the present invention has a configuration similar to the rotor 1 according to the first exemplary embodiment and, and one end cap 15 and the other end cap 17 are connected to the outer peripheries of the extension portions 25 extended to both ends of the connector 13 through thermal insertion, respectively.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A rotor assembling method for an electric turbocharger, comprising:
    a first step for washing and preparing components of a rotor including a connector, a permanent magnet, end caps, a retention ring, and a center pipe;
    a second step for inserting a connector into the permanent magnet;
    a third step for thermally inserting one or more end caps into the connector by cooling the connector and heating the one or more end caps under a first high-temperature condition for a first predetermined time to form a permanent magnet assembly;

a fourth step for thermally inserting the permanent magnet assembly into the retention ring by cooling the permanent magnet assembly and heating the retention ring under a second high-temperature condition for a second predetermined time to form a rotor assembly;

a fifth step for thermally inserting the center pipe into the rotor assembly by heating the rotor assembly under a third high-temperature condition for a third predetermined time to form a rotor assembling body; and a sixth step for post processing the rotor assembling body.

2. The method of claim 1, wherein in the first step for washing and preparing the components, alcohol is used as a washing liquid.

3. The method of claim 1, wherein in the third step, one end cap is integrally formed at one end of the connector and one end cap is thermally inserted into the other side of the connector.

4. The method of claim 1, wherein in the third step, end caps are thermally inserted into both ends of the connector in the third step.

5. The method of claim 1, wherein liquid nitrogen is used as a cooling liquid to cool the connector in the third step or the permanent magnet assembly in the fourth step or both.

6. The method of claim 1, wherein the one or more end caps in the third step or the retention ring in the fourth step or both are heated in an oven at a temperature in the range of 650° C.±10° C. for 25 to 35 minutes.

7. The method of claim 1, wherein the rotor assembly in the fifth step is heated in the oven at a temperature in the range of 220° C.±5° C. for 12 hours or more.

8. The method of claim 1, wherein the sixth step for post processing the rotor assembling body includes surface treatment performed on connection surfaces of, between or among the retention ring, the end caps and the center pipe.

9. The method of claim 1, wherein the connector, the end caps, and the retention ring are made of an INCONEL material.

10. The method of claim 1, wherein the center pipe is made of stainless, steel, or an aluminum-based material.

* * * * *